United States Patent

Hayashi et al.

[11] Patent Number: 5,124,207
[45] Date of Patent: Jun. 23, 1992

[54] MAGNETIC IRON OXIDE PARTICLES

[75] Inventors: Kazuyuki Hayashi; Keisuke Iwasaki; Yasuyuki Tanaka; Hiroko Itamochi, all of Hiroshima, Japan

[73] Assignee: Toda Kogyo Corp., Hiroshima, Japan

[21] Appl. No.: 511,285

[22] Filed: Apr. 10, 1990

[30] Foreign Application Priority Data

Apr. 20, 1989 [JP] Japan ................... 1-103135

[51] Int. Cl.⁵ .............................. C04B 35/26
[52] U.S. Cl. ...................... 428/404; 252/62.58; 252/62.59; 252/62.62; 252/62.63; 252/62.64
[58] Field of Search ............... 428/403, 404; 252/62.58, 62.59, 62.62, 62.63, 62.64

[56] References Cited

U.S. PATENT DOCUMENTS

| 4,082,905 | 4/1978 | Stephan et al. | 252/62.62 |
| 4,259,368 | 3/1981 | Rudolf et al. | 252/62.62 |
| 4,956,220 | 9/1990 | Sueyoshi et al. | 428/404 |

FOREIGN PATENT DOCUMENTS 61-22604  1/1986  Japan ................... 428/404

Primary Examiner—Jack Cooper
Attorney, Agent, or Firm—Nixon & Vanderhye

[57] ABSTRACT

Disclosed herein is a magnetic iron oxide particle comprising a magnetic iron oxide core particle containing ferrous iron, a Zn compound layer as a lower coating layer on the surface of said core particle, and an Si compound layer as an upper coating layer thereon.

8 Claims, 1 Drawing Sheet

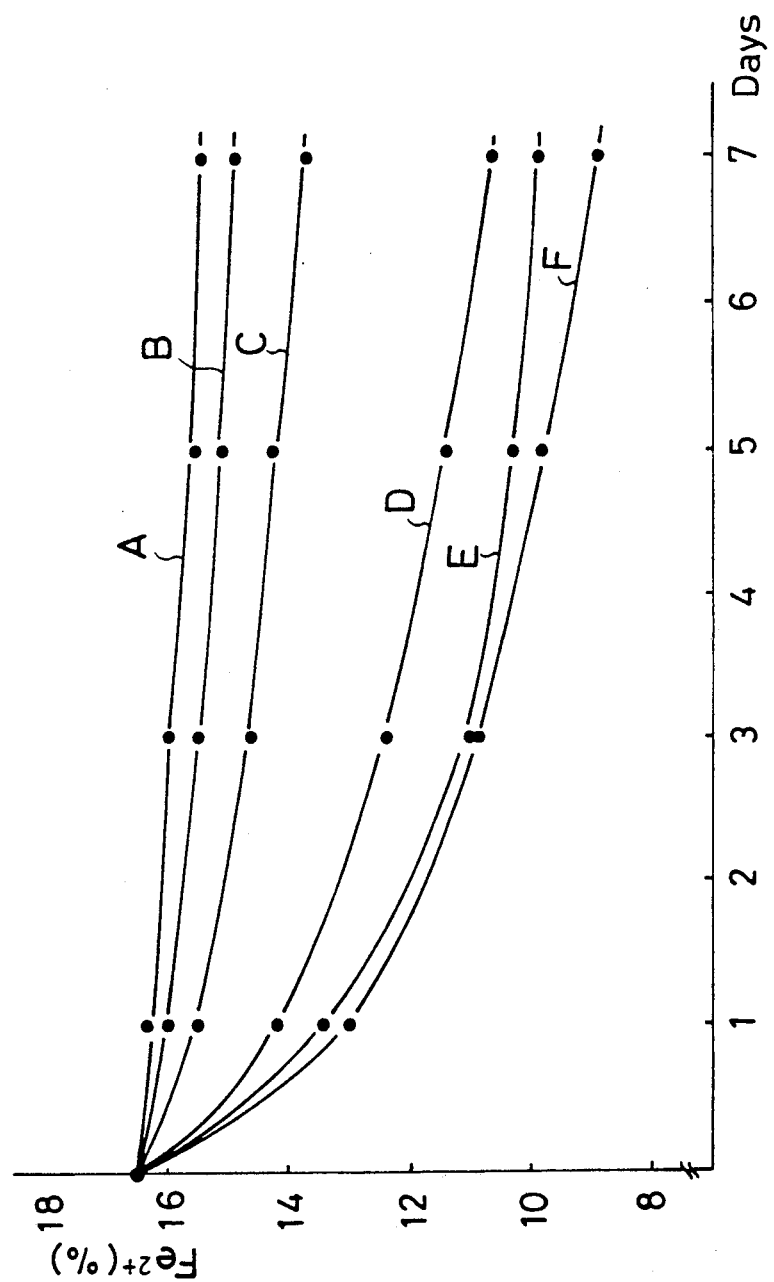

MAGNETIC IRON OXIDE PARTICLES

BACKGROUND OF THE INVENTION

The present invention relates to the magnetic iron oxide particles containing ferrous, which the particles are fine in size, high in coercive force, and magnetically and chemically stable.

With progressing miniaturization and weight reduction of magnetic recording and reproducing devices in recent years, the necessity has arisen keenly for the higher quality and performance of recording media such as magnetic tapes and discs. Especially demands are heard for higher recording density, higher sensitivity, higher output capacity, and higher magnetic and chemical stability of the magnetic media.

For satisfying such requirements for the magnetic recording media, the magnetic iron oxide particles used for making such recording media are essentially demanded to be fine in size, high in coercive force, and also magnetically and chemically stable.

This fact is referred to in many literatures. For instance, "Development of Magnetic Materials and High Dispersion Techniques for Magnetic Powders" (1982) published by Sogo Gijutsu Center Co., Ltd. states on page 310: "Since the main themes of improvement on magnetic tape performance were the realization of higher sensitivity, higher output capacity and lower noise level, the studies have been directed to the attainment of higher coercive force and smaller size of acicular $\gamma$-$Fe_2O_3$ particles". Also, Japanese Patent Publication No. 55-6580 states: "There is seen a tendency of recording signals to transfer to the shorter wavelength region in recent years, such a tendency being particularly conspicuous in video cassette recorders. In other words, demands is rising for higher-density recording, higher-output capacity and, in particular, improvement of frequency characteristics and magnetic stability. The properties of the magnetic material for satisfying these requirements for the magnetic recording media are magnetic stability and a high coercive force (Hc)".

Among the known magnetic iron oxide particles, magnetite particles have the advantages that they are high in coercive force and saturated flux density in comparison with maghemite particles, and that when a magnetic recording medium is made by using magnetite particles, such recording medium is hardly electrically charged because of high electroconductivity.

As a typical example of magnetic iron oxide particles having high coercive force, there are known so-called Co-modified magnetic iron oxide particles which have been produced by coating on or substituting the surfaces of magnetite or maghemite particles as precursor particles with a Co compound. In preparation of such Co-modified magnetic iron oxide particles, it is commonly practiced to incorporate ferrous along with Co in the particles, when coating on or substituting their surfaces with a Co compound, for further enhancing the coercive force.

Thus, the magnetic iron oxide particles which are fine in size, high in coercive force, and also magnetically and chemically stable are the most eagerly required in the art at present. However, known magnetite particles or Co-modified magnetic iron oxide particles, although having high coercive force as mentioned above, have the defect that they are magnetically and chemically unstable due to incorporation of ferrous. That is, when the magnetic iron oxide particles containing ferrous are left in the air, ferrous contained therein is oxidized into ferric, thereby deteriorating magnetic properties, especially reduction of coercive force, with the passage of time. This phenomenon tends to become more marked as the particle size becomes smaller.

Recently, the problem is also pointed out that when magnetic iron oxide particles containing ferrous are used as magnetic tape coating material, the color tone of the coat is changed from normal black into dark brown due to oxidation of ferrous in the said particles into ferric to cause an increase of light transmittance, resulting in inducing improper run of magnetic tape in the recording devices such as video deck.

As a result of the present inventors' extensive studies to provide magnetic iron oxide particles containing ferrous which are free of the said defects and can well satisfy the said requirements, it has been found that magnetic iron oxide particles containing ferrous and having their surfaces coated with double layers of a lower layer of a Zn compound and an upper layer of a Si compound, which have been obtained by mixing and dispersing magnetic iron oxide particles containing ferrous in a solution of a Zn compound to adsorb the Zn compound on the particle surfaces, and then mixing and dispersing the obtained Zn compound-adsorbed particles in a solution of a Si compound to adsorb the Si compound on the Zn compound-adsorbed particle surfaces, are satisfactorily fine in size, high in coercive force, and also magnetically and chemically stable. The present invention was achieved on the basis of this finding.

SUMMARY OF THE INVENTION

In a first aspect of the present invention, there is provided a magnetic iron oxide particle comprising a magnetic iron oxide core particle containing ferrous, a Zn compound layer as a lower coating layer on the surface of the said core particle, and an Si compound layer as an upper coating layer thereon.

In a second aspect of the present invention, there is provided a magnetic iron oxide particle comprising a magnetic iron oxide core particle containing ferrous, a Zn compound layer as a lower coating layer on the surface of the said core particle, and a layer of compounds containing Si and at least one element selected from Al, Ca, Zr, Sb, Ti, V, Mg, Ba and Zn, as an upper coating layer thereon.

BRIEF EXPLANATION OF THE DRAWING

FIG. 1 is a graph showing change in content of ferrous iron in the Co-modified magnetite particles when the said particles were left under the conditions of 60° C. and 90% RH. In the graph, A to F represent the patterns of change in the Co-modified magnetite particles of Example 2, Example 1, Comparative Example 7, Comparative Example 4, Comparative Example 3 and Comparative Example 1, respectively.

DETAILED DESCRIPTION OF THE INVENTION

The term "magnetic iron oxide particles containing ferrous" used in the present invention means magnetite ($FeO_x \cdot Fe_2O_3$, $0 < x \leq 1$) particles, and Co-modified magnetite or maghemite particles having their surfaces coated or modified with Co and Fe (II).

The Zn compound of the lower layer on the surface of the magnetic iron oxide particles according to the present invention includes zinc sulfate, zinc nitrate, zinc chloride, zinc acetate, zinc oxides, zinc hydroxides and the like. As the content of Zn compound in the particle surface, 0.1 to 5% by weight, calculated as Zn, based on the magnetic iron oxide particle containing ferrous iron are preferred. When this content is less than 0.1% by weight, the desired effect tends not to be obtained. On the other hand, when the content exceeds 5% by weight, although there can be obtained the magnetically and chemically stable magnetic iron oxide particles, saturation magnetization of the particles tends to lower due to the increase of Zn compound which has no concern with magnetism of the particle.

The Si compound of the upper layer on the surface of the magnetic iron oxide particle according to the present invention includes water glass, colloidal silica, silicon oxide, sodium silicate, potassium silicate and the like. As the content of Si compound in the particle surface 0.1 to 5% by weight, calculated as $SiO_2$, based on the magnetic iron oxide particle containing ferrous are preferred. When the content of Si compound is less than 0.1% by weight, the desired effect tends not to be obtained. When the content exceeds 5% by weight, although there can be obtained the magnetically and chemically stable magnetic iron oxide particles, saturation magnetization tends to lower because of the increase of Si compound which has no concern with magnetism of the particle.

The weight ratio of Zn compound layer to Si compound layer in the present invention is in the range of 0.2-5/1. When this ratio is less than 0.2/1 or exceeds 5/1, it becomes hard to obtain the desired effect.

The Si compound layer (upper coating layer) on the surface of the particle according to the present invention may be a layer of compounds containing Si and at least one metal selected from the group consisting of Al, Ca, Zr, Sb, Ti, V, Mg, Ba and Zn.

The compounds of metals Al, Ca, Zr, Sb, Ti, V, Mg, Ba and Zn usable in the present invention are the sulfates, nitrates, chlorides, oxides, hydroxides, etc., of the said metals. The total content of the compounds of Si and at least one metal selected from Al, Ca, Zr, Sb, Ti, V, Mg, Ba and Zn on the surface of the magnetic iron oxide particle is 0.05 to 5% by weight, calculated as the sum of the amount of $SiO_2$ and the amount of specified metal element(s), based on the magnetic iron oxide particle containing ferrous. When the content is less than 0.05% by weight, the desired effect tends not to be obtained, and when the content exceeds 5% by weight, although there can be obtained the magnetically and chemically stable magnetic iron oxide particles, saturation magnetization of the particle tends to lower due to the increase of Si and specified metal(s) which has no concern with magnetism of the particle. The Si compound/specific metal ratio in the upper layer is, expressed as $SiO_2$/specific metal element molar ratio, is 1-10/1. When this ratio is less than 1/1 or exceeds 10/1, it is difficult to obtain the desired magnetically and chemically stable magnetic iron oxide particles containing ferrous.

The total amount of Zn compound of the lower layer and Si compound or compounds containing Si and at least one metal selected from Al, Ca, Zr, Sb, Ti, V, Mg, Ba and Zn of the upper layer is preferably not more than 6% by weight, calculated as the sum of the amount of $SiO_2$ and the amount of metal element(s), based on the weight of the magnetic iron oxide particle containing ferrous. When the total amount of the compounds of the lower and upper layers exceeds 6% by weight, although there can be obtained the chemically stable magnetic iron oxide particles, saturation magnetization of the particles tends to lower due to the increase of non-magnetic compounds in the particle surface.

As seen from the Examples and Comparative Examples described later, it has been confirmed that the desired effect of the present invention cannot be obtained either in case of coating the particle surface with a single Zn compound layer or Si compound layer, or in case of coating the particle surface with double layers in which the lower layer is an Si compound layer and the upper layer is a Zn compound layer. However, there can be obtained a magnetically and chemically stable magnetic iron oxide particle containing ferrous when the particle surface is coated with double layers in which the lower layer is a Zn compound layer and the upper layer is an Si compound layer.

FIG. 1 is a graph showing the change of content of ferrous in the Co-modified magnetite particles when they were left under the conditions of 60° C. and 90% RH. In the graph, curves A and B represent the change of ferrous content in the Co-modified magnetite particles obtained in Example 2 and Example 1, respectively; curve E represents the change of ferrous content in the Co-modified magnetite particles obtained in Comparative Example 3, and curve D represents the change of ferrous content in the Co-modified magnetite particles obtained in Comparative Example 4.

As seen from the FIG. 1, the Co-modified magnetite particles having a double-layer coating comprising a lower layer composed of a zinc hydroxide and an upper layer composed of silicon oxide are very chemically stable in comparison with the Co-modified magnetite particles having their surfaces coated with a single layer of a zinc hydroxide or silicon oxide.

Coating of the particle surfaces with a Zn compound layer in the present invention can be accomplished by, for instance, the following methods: the magnetic iron oxide particles containing ferrous are mixed and dispersed in a solution of a Zn compound such as zinc sulfate, zinc nitrate, zinc chloride, zinc acetate, zinc oxides or zinc hydroxides so that the Zn compound is adsorbed on the particle surfaces; a solution of a Zn compound such as zinc sulfate, zinc nitrate, zinc chloride, zinc acetate or the like is neutralized with an alkali and the magnetic iron oxide particles containing ferrous are mixed and dispersed in the resultant solution so that zinc hydroxides is deposited on the particle surfaces.

Coating of the particle surfaces with an Si compound layer or a layer of compounds containing Si and at least one metal selected from Al, Ca, Zr, Sb, Ti, V, Mg, Ba and Zn in the present invention can be accomplished by, for instance, the following methods: the magnetic iron oxide particles containing ferrous coated with Zn compound layer are mixed and dispersed in a solution of an Si compound such as water glass, colloidal silica, silicon oxide, sodium silicate potassium silicate etc., or a mixed solution of such an Si compound and compound(s) of one or more of the said metals such as sulfate, nitrate, chloride, oxide or hydroxide of the said metals, so that the Si compound or the compounds containing Si and the specified metal(s) is (are) adsorbed on the particle surfaces; a solution of an Si compound or a mixed solution of Si and specified metal(s) is neutralized with an acid or alkali and the magnetic iron oxide particles containing ferrous are mixed and dispersed in the resultant solution so that silicon oxide, or an oxide or hydroxide containing Si and specified metal(s) is (are) deposited on the particle surfaces.

When carrying out the coating treatment with a Zn compound in the present invention, it is preferable to have the particles dispersed well in the solution by previously adding a dispersing agent into an aqueous suspension of the magnetic iron oxide particles containing ferrous. As the dispersing agent, iron sol, alumina sol, zirconia sol and the like can be effectively used.

The magnetic iron oxide particles according to the present invention have the following properties: a particle shape is acicular, spindle, cubic, octahedron, spherical or plate-like; a particle diameter is not more than 0.40 μm, preferably 0.05 to 0.35 μm; in the case of acicular particles, a major axial diameter is not more than 0.40 μm, preferably 0.05 to 0.35 μm, and an axial ratio (major axial diameter/minor axial diameter) is not less than 5.0, preferably not less than 6.0; a coercive force (Hc) in the case of acicular particles non Co-modified is 300–400 Oe and the coercive force (Hc) in the case of acicular particles Co-modified is 400–1200 Oe, preferably 600–900 Oe, a coercive force (Hc) in the case of cubic particles non Co-modified is 70–110 and the coercive force (Hc) in the case of cubic particle Co-modified is 100–900 Oe, preferably 100–600 Oe, a coercive force (Hc) in the case of octahedron particles non Co-modified is 110–140 Oe and the coercive force (Hc) in the case of octahedron particles Co-modified is 150–950 Oe, preferably 150–650 Oe, a coercive force (Hc) in the case of spherical particles non Co-modified is 40–80 Oe and the coercive force (Hc) in the case of spherical particles Co-modified is 50–700 Oe, preferably 50–500 Oe; reduction rate of coercive force after the lapse of 7 days is not more than 2%, preferably not more than 1.5%; and reduction rate of $Fe^{2+}$ after the lapse of 7 days is less than 20% by weight, preferably less than 10% by weight.

The magnetic iron oxide particles according to the present invention are suited for use as magnetic iron oxide particles for producing magnetic recording media with high recording density, high sensitivity and high output capacity.

Further, since the magnetic iron oxide particles according to the present invention are magnetically and chemically stable, and a color tone change thereof from black into dark brown is prevented, they can be used as magnetic iron oxide particles for electrophography.

[EXAMPLES]

The present invention will be more precisely explained while referring to Examples as follows.

However, the present invention is not restricted to Examples under mentioned. From the foregoing description, one skilled in the art can easily ascertain the essential characteristics of the present invention, and without departing from the spirit and scope thereof, can make various changes and modifications of the invention to adapt it to various usages and conditions.

In the following descriptions of Examples and Comparative Examples, the major axial diameter of particle and the axial ratio (major axial diameter/minor axial diameter) were shown by the average of the values determined from electron micrographs.

The contents of Zn, Si, Al, Ca and Co were determined by a fluorescent X-ray analysis, and $Fe^{2+}$ was measured according to a chemical analytical method.

The magnetic properties were determined by applying an external magnetic field of up to 10 KOe by using a sample vibrating type magnetometer Model VSM-3S-15 manufactured by Toei Kogyo K.K.

The initial $Fe^{2+}$ content in the magnetic iron oxide particles containing ferrous was shown by the value determined from the particles obtained after drying in high-purity nitrogen at 60° C. for 24 hours. The change of $Fe^{2+}$ content with the passage of time was shown by the values determined in the air under the conditions of 60° C. and 90% RH.

EXAMPLE 1

500 g of Co-modified acicular magnetite particles having a major axial diameter of 0.2 μm, an axial ratio (major axial diameter/minor axial diameter) of 7 : 1, an $Fe^{2+}$ content of 16.7% by weight, a Co content of 4.24% by weight and a coercive force of 850 Oe were mixed and dispersed in 5 litres of an $8.6 \times 10^{-3}$ mol/l aqueous solution of zinc chloride (equivalent to 0.56% by weight, calculated as Zn, based on the core particle). Then an NaOH solution was added to the resultant dispersion to adjust its pH to 7.0, thereby forming a zinc hydroxides layer on the particle surfaces, and then the thus obtained particles were filtered and dried by the usual methods to obtain black particles. The amount of Zn present on the surface of the obtained black particle, as measured by fluorescent X-ray analysis, was 0.55% by weight.

To an aqueous suspension containing 100 g of the said black particles was added sodium hydroxide to adjust pH of the suspension to 11.0, followed by addition of 6 g of #3 water glass (equivalent to 1.74% by weight, calculated as $SiO_2$, based on the core particle). Then the suspension was stirred and mixed up, and sulfuric acid was added to the resultant suspension to adjust pH to 7.0, thereby forming an $SiO_2$ layer on the surface of the acicular magnetite particle coated with zinc hydroxides.

The suspension containing the thus obtained sediment of black particles was filtered, washed with water and dried in $N_2$ gas at 60° C. for 24 hours, all in the usual methods.

The amount of $SiO_2$ present on the thus obtained black particle surface, as measured by fluorescent X-ray analysis, was 1.71% by weight. The results of chemical analysis also showed that the particle had an $Fe^{2+}$ content of 16.4% by weight and a coercive force of 846 Oe.

The change with the passage of time (of $Fe^{2+}$ content and coercive force) of the obtained black particles when left under the environmental conditions specified above was as shown by curve B in FIG. 1 and in Table 2, which indicates very excellent chemical and magnetic stability of the particles.

EXAMPLES 2–4 and COMPARATIVE EXAMPLES 1–6

Coated particles were obtained by following the same procedure as Example 1 except for the change of the kind of core particle, the kind and amount of Zn compound, the kind and amount of Si compound and the kind and amount of specified metal used.

The change with the passage of time (of $Fe^{2+}$ content and coercive force) of the Co-modified acicular magnetic iron oxide particles which had no coating-treatment and of the coated particles described above was as shown in Table 2.

Also, the change of $Fe^{2+}$ content in the particles of Example 2, Comparative Example 1, Comparative Example 3 and Comparative Example 4 when they were left under the specified environmental conditions was as shown in FIG. 1, in which curves A, F, E and D represent the particles of Example 2, Comparative Example 1, Comparative Example 3 and Comparative Example 4, respectively. As seen from Table 2 and FIG. 1, the magnetic iron oxide particles of Examples 2 to 4 are very excellent chemical and magnetic stability. In contrast, the magnetic iron oxide particles of Comparative Examples 1 to 6 were very poor in chemical and magnetic stability.

COMPARATIVE EXAMPLE 7

Coated particles were obtained in the same procedure as Example 1 except that the order of coating-treatment for forming the Zn compound layer and the Si compound layer was reversed. The change with the passage of time of $Fe^{2+}$ content and coercive force of these particles when left under the specified environmental conditions is shown in Table 2.

Also, the change of $Fe^{2+}$ content in the particles when left under said conditions is represented by curve C in FIG. 1. As seen from Table 2 and FIG. 1, the magnetic iron oxide particles of Comparative Example 7 were poor in chemical and magnetic stability.

TABLE 1

| | Kind of particle to be treated | | | Treatment with Zn compound | | |
|---|---|---|---|---|---|---|
| | | | | Zn compound | | |
| | Kind | $Fe^{2+}$ (wt %) | Coercive force Hc (Oe) | Kind | Amount added, calcd. as Zn (wt %) | Addition of alkali, & pH |
| EXAMPLE | | | | | | |
| 1 | Co-modified acicular magnetite particle (major axis: 0.2 μm; axial ratio = 7/1; Co = 4.2 wt %) | 16.7 | 850 | Zinc chloride | 0.56 | NaOH 7.0 |
| 2 | Co-modified acicular magnetite particle (major axis: 0.2 μm; axial ratio = 7/1; Co = 4.2 wt %) | 16.7 | 850 | Zinc chloride | 0.56 | NaOH 7.0 |
| 3 | Co-modified acicular maghemite particle (major axis: 0.3 μm; axial ratio = 8/1; Co = 5.20 wt %) | 5.8 | 891 | Zinc acetate | 0.51 | NaOH 7.0 |
| 4 | Co-modified acicular maghemite particle (major axis: 0.3 μm; axial ratio = 8/1; Co = 5.20 wt %) | 5.8 | 891 | Zinc acetate | 05.1 | NaOH 7.0 |
| COMP. EXAMPLE | | | | | | |
| 1 | Same Co-modified acicular magnetite particle as used in Example 1 | 16.7 | 850 | — | — | — |
| 2 | Same Co-modified acicular maghemite particle as used in Example 3 | 5.8 | 891 | — | — | — |
| 3 | Same Co-modified acicular magnetite particle as used in Example 1 | 16.7 | 850 | Zinc chloride | 0.56 | NaOH 7.0 |
| 4 | Same Co-modified acicular magnetite particle as used in Example 1 | 16.7 | 850 | — | — | — |
| 5 | Same Co-modified acicular maghemite particle as used in Example 3 | 5.8 | 891 | Zinc acetate | 0.51 | NaOH 7.0 |
| 6 | Same Co-modified acicular maghemite particle as used in Example 3 | 5.8 | 891 | — | — | — |

| | Treatment with Si compound or compounds Containing Si and specific metal | | | | Coated particles | | | | |
|---|---|---|---|---|---|---|---|---|---|
| | Si compound | | Specific metal | | | | | | |
| | Kind | Amount added, calcd. as $SiO_2$ (wt %) | Kind | Amount added (wt %) | Addition of acid & pH | Content of Zn (wt %) | Content of $SiO_2$ (wt %) | Content of specific metal (wt %) | $Fe^{2+}$ (wt %) | Coercive force Hc (Oe) |
| EXAMPLE | | | | | | | | | | |
| 1 | #3 water glass | 1.74 | — | — | Sulfuric acid 7.0 | 0.55 | 1.71 | — | 16.4 | 846 |
| 2 | #3 water glass | 1.74 | Aluminum sulfate | 0.27 | Sulfuric acid 7.0 | 0.54 | 1.69 | 0.26 | 16.4 | 849 |
| 3 | #3 water glass | 1.45 | — | — | Sulfuric acid 7.0 | 0.51 | 1.43 | — | 5.7 | 892 |
| 4 | #3 water glass | 1.45 | Calcium chloride | 0.20 | Sulfuric acid 7.0 | 0.50 | 1.42 | 0.19 | 5.6 | 891 |
| COMP. EXAMPLE | | | | | | | | | | |
| 1 | — | — | — | — | — | — | — | — | 16.7 | 844 |

TABLE 1-continued

| | | | | | | | | | | |
|---|---|---|---|---|---|---|---|---|---|---|
| 2 | — | — | — | — | — | — | — | — | 5.8 | 890 |
| 3 | — | — | — | — | — | 0.56 | — | — | 16.6 | 843 |
| 4 | #3 water glass | 1.74 | — | — | Sulfuric acid 7.0 | — | 1.72 | — | 16.5 | 846 |
| 5 | — | — | — | — | — | 0.50 | — | — | 5.7 | 886 |
| 6 | #3 water glass | 1.45 | — | — | Sulfuric acid 7.0 | — | 1.43 | — | 5.7 | 886 |

TABLE 2

| | Kind of coated particles | | | | | | | | | |
|---|---|---|---|---|---|---|---|---|---|---|
| | Change with the passage of time of $Fe^{2+}$ content (wt %) under environment of 60° C. and 90% RH | | | | | Change with the passage of time of coercive force (Oe) under environment of 60° C. and 90% RH | | | | |
| | Initial | 1 day | 3 days | 5 days | 7 days | Initial | 1 day | 3 days | 5 days | 7 days |
| EXAMPLE | | | | | | | | | | |
| 1 | 16.4 | 16.0 | 15.5 | 15.1 | 14.9 | 846 | 843 | 843 | 841 | 841 |
| 2 | 16.4 | 16.3 | 16.0 | 15.5 | 15.4 | 849 | 849 | 846 | 847 | 846 |
| 3 | 5.7 | 5.5 | 5.2 | 5.2 | 5.2 | 892 | 889 | 886 | 882 | 882 |
| 4 | 5.6 | 5.6 | 5.4 | 5.3 | 5.4 | 891 | 891 | 886 | 889 | 889 |
| COMP. EXAMPLE | | | | | | | | | | |
| 1 | 16.7 | 13.0 | 10.9 | 9.8 | 8.9 | 844 | 825 | 800 | 783 | 768 |
| 2 | 5.8 | 4.3 | 3.8 | 3.5 | 3.2 | 890 | 867 | 838 | 821 | 796 |
| 3 | 16.6 | 13.4 | 11.0 | 10.3 | 9.9 | 843 | 830 | 810 | 801 | 779 |
| 4 | 16.5 | 14.2 | 12.4 | 11.4 | 10.6 | 846 | 832 | 828 | 801 | 796 |
| 5 | 5.7 | 5.0 | 4.7 | 4.2 | 4.0 | 886 | 869 | 849 | 840 | 831 |
| 6 | 5.7 | 5.3 | 5.0 | 4.3 | 4.3 | 886 | 874 | 867 | 862 | 859 |
| 7 | 16.4 | 15.5 | 14.6 | 14.3 | 13.7 | 845 | 836 | 830 | 821 | 810 |

What is claimed is:

1. An acicular magnetic iron oxide particle comprising a Co-modified acicular magnetic iron oxide core particle containing ferrous, a Zn compound layer of 0.1 to 5% by weight, calculated as Zn, based on the Co-modified acicular magnetic iron oxide core particle containing ferrous, as a lower coating layer on the surface of said core particle, and an Si compound layer of 0.1 to 5% by weight, calculated as $SiO_2$, based on the Co-modified acicular magnetic iron oxide core particle containing ferrous, as an upper coating layer thereon, wherein the weight ratio of the Zn compound layer to Si compound layer being 0.2-5/1, and the acicular magnetic iron oxide particle has a major axial diameter of 0.05 to 0.35 μm, an axial ratio (major axial diameter/minor axial diameter) of not less than 5.0, a coercive force of 600 to 1200 Oe and exhibits a smaller percent reduction in $Fe^{2+}$ content after seven days in air at 60° C. and 90% RH than said acicular magnetic iron oxide particle in which either the Zn compound layer or the Si compound layer is absent or where the Zn compound is the upper coating layer and the Si compound is the lower coating layer on the surface of said core particle.

2. An acicular magnetic iron oxide particle according to claim 1, wherein the amount of the Zn compound layer and the Si compound layer is not more than 6% by weight based on the Co-modified acicular magnetic iron oxide particle containing ferrous.

3. An acicular magnetic iron oxide particle according to claim 1, which exhibits a reduction rate of coercive force after seven days in air at 60° C. and 90% RH of not more than 2%.

4. An acicular magnetic iron oxide particle according to claim 1, which exhibits a reduction rate of $Fe^{2+}$ after seven days in air at 60° C. and 90% RH of less than 20% by weight.

5. An acicular magnetic iron oxide particle comprising a Co-modified acicular magnetic iron oxide core particle containing ferrous, a Zn compound layer of 0.1 to 5% by weight, calculated as Zn, based on the Co-modified acicular magnetic iron oxide core particle containing ferrous, as a lower coating layer on the surface of said core particle, and a layer of compounds containing Si and at least one metal selected from Al, Ca, Zr, Sb, Ti, V, Mg, Ba and Zn, of 0.05 to 5% by weight, calculated as $SiO_2$ plus said metal element(s), based on the Co-modified acicular magnetic iron oxide core particle containing ferrous, as an upper coating layer thereon, wherein the weight ratio of the Zn compound layer to the compound layer containing Si and said metal(s) is 0.2-5/1 and the molar ratio of the Si compound to said metal(s) compound of the upper layer is 1-10/1, and the acicular iron oxide particle has a major axial diameter of 0.05 to 0.35 μm, an axial ratio (major axial diameter/minor axial diameter) of not less than 5.0, a coercive force of 600 to 1200 Oe and exhibits a smaller percent reduction in $Fe^{2+}$ content after seven days in air at 60° C. and 90% RH than said acicular magnetic iron oxide particle in which either the Zn compound layer or the layer of compounds containing Si and said at least one metal is absent or where the Zn compound is the upper coating layer and the compounds containing Si and said at least one metal are the lower coating layer on the surface of said core particle.

6. An acicular magnetic iron oxide particle according to claim 5, wherein the amount of the Zn compound and the compounds layer containing Si and said metal is not more than 6% by weight based on the Co-modified acicular magnetic iron oxide particle containing ferrous.

7. An acicular magnetic iron oxide particle according to claim 5, which exhibits a reduction rate of coercive force after seven days in air at 60° C. and 90% RH of not more than 2%.

8. An acicular magnetic iron oxide particle according to claim 5, which exhibits a reduction rate of $Fe^{2+}$ after seven days in air at 60° C. and 90% RH of less than 20% by weight.

* * * * *